United States Patent Office 3,192,464
Patented June 29, 1965

3,192,464
TRANSISTORIZED REGULATED
D.C.-D.C. CONVERTER
Arthur R. Johnson, Des Plaines, Ill., and Ove E. Petersen, Holte, Denmark, assignors to Admiral Corporation, Chicago, Ill., a corporation of Delaware
Filed Apr. 25, 1961, Ser. No. 105,338
6 Claims. (Cl. 321—2)

This invention relates in general to power supplies and in particular to power supplies wherein a first source of direct current voltage is utilized to develop a second, higher source of direct current voltage.

Power supplies of this type are commonly called converters and comprise the combination of an inverter for changing direct current into alternating current and a rectifier for changing the alternating current into direct current, usually at a different voltage.

D.C. to D.C. converters generally are well known in the art and such converters employed transistorized self-excited oscillators are known. If the converter is to have good voltage regulation characteristics, some type of feedback and voltage control is required. In the past this has been accomplished by utilizing a reference potential with which to compare the output voltage of the converter. Zener diodes are expensive and batteries are subject to deterioration. The invention makes possible a completely transistorized D.C. to D.C. converter having excellent voltage regulation characteristics without requiring a reference voltage device.

In accordance with the invention a voltage indicative of the output voltage of the converter is developed, rectified, amplified, and fed to a control transistor which is connected in the base circuits of the oscillator transistors. The control transistor is capable of controlling the translation characteristics of the oscillator transistors.

Accordingly an object of this invention is to provide a transistorized power supply, including means for regulating the output voltage thereof without requiring the use of a separate reference device.

A further object of this invention is to provide a control in the feedback circuit of a D.C. to D.C. converter for initially determining the output voltage of the D.C. to D.C. converter and subsequently providing regulation to that voltage.

A feature of this invention is in the provision of a pair of relatively inexpensive transistors in the feedback control loop for controlling the output voltage of the D.C. to D.C. converter.

Other objects and features of this invention will become apparent upon a reading of the specification in conjunction with the drawings, in which.

Figure 1:
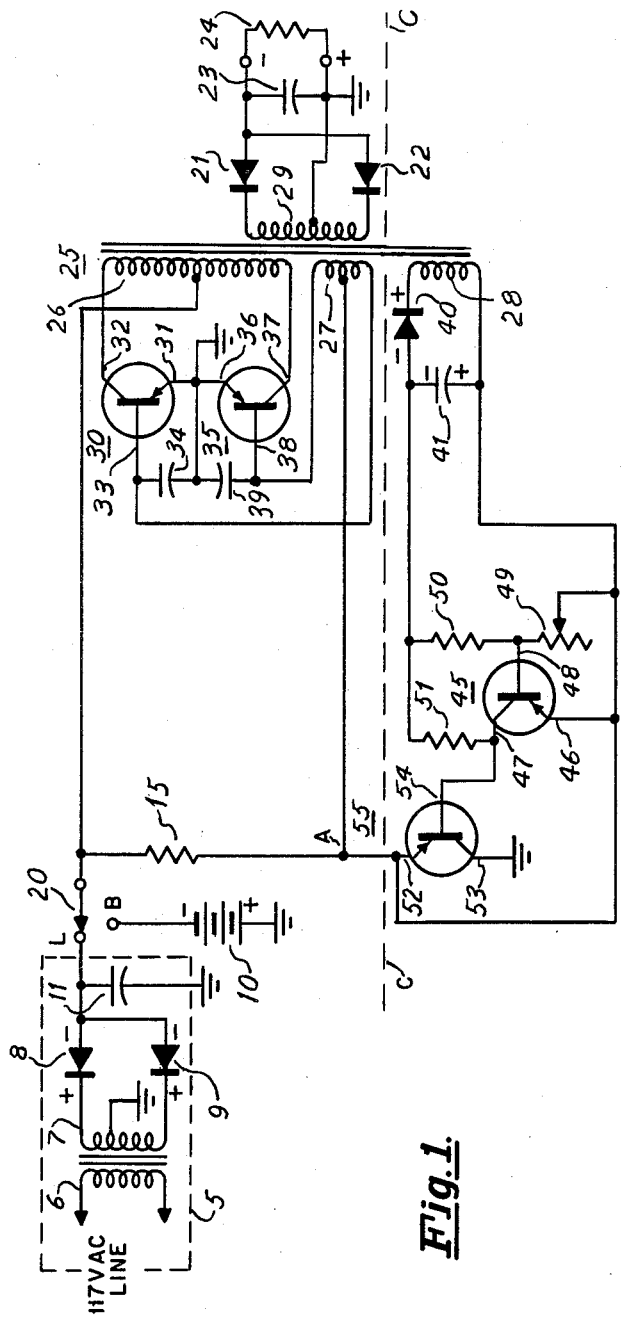
FIG. 1 is a schematic diagram of a preferred embodiment of the invention.

Referring now to FIG. 1, there is shown within dashed line block 5 a D.C. power supply including a transformer primary winding 6, adapted to be connected to a standard household electrical source, and a transformer secondary winding 7 having a grounded center tap. A pair of diodes 8 and 9 are respectively connected in series with the secondary leads, in the polarity shown, and connected together at their remaining terminals. A filter capacitor 11 is connected between the common terminal of the diodes 8 and 9 and ground. This arrangement is quite standard in the art and will be readily recognizable as a full wave rectifier circuit for rectifying the alternating current input source voltage. Thus a direct current output voltage is obtained.

The negative output of this D.C. supply appears at the ungrounded terminal of capacitor 11 which is connected to a switch contact L. A battery 10 having its positive terminal grounded is shown as an alternate D.C. source and has its negative terminal connected to a switch terminal B.

A switch 20 is arranged to selectively make contact with terminals L and B. Thus either direct D.C. to D.C. conversion from an internal battery or indirect D.C. to D.C. conversion from an external alternating current source and rectifier may be obtained.

For simplicity in discussion, the circuit below dashed line C will be ignored temporarily and the junction labelled A considered connected to ground through a fixed resistance. The portion above dashed line C is immediately recognizable as a standard D.C. to D.C. converter circuit in which a saturable transformer 25, having a tapped primary winding 26 and a feedback winding 27, as well as a load supplying secondary winding 29, is provided. A pair of transistors 30 and 35 having emitters 31 and 36, collectors 32 and 37, and bases 33 and 38, respectively, are arranged with their collectors connected to respective ends of primary winding 26. The center tap of primary winding 26 is returned to switch 20. The ends of feedback winding 27 are connected to bases 33 and 38, respectively. A pair of capacitors 34 and 39 are connected between bases 33 and 38, respectively, and ground. These capacitors are utilized to bypass transient switching voltages. The circuit is completed by the connection of resistor 15 between switch 20 and point A, which point, it will be recalled, is returned to ground through a resistor. Point A is also connected to the center tap on feedback winding 27.

Assume for a moment that switch 20 is in position B and therefore battery 10 is in the circuit. The collector circuits of transistors 30 and 35 are energized from battery 10 through respective halves of winding 26. Due to inherent minor differences in transistor characteristics, one of them will tend to conduct more than the other and in so doing retard conduction in the other.

Assume for example that transistor 30 is driven slightly conductive. As current flows between its collector 32 and emitter 31, a potential is developed across winding 26, which potential sets up flux in transformer 25, and is reflected in a voltage appearing across winding 27. The windings 26 and 27 are poled such that increasing current to transistor 30 gives rise to a potential across the feedback winding which is negative at the lower end of winding 27. This potential is applied to the base of transistor 30 and tends to drive transistor 30 more conductive. The potential at the upper end of winding 27 is positive and, when applied to the base of transistor 35, tends to drive transistor 35 into cutoff.

Conduction in transistor 30 rapidly increases until saturation occurs in transformer 25. Upon saturation occurring, the induced voltages in the transformer fall to zero since they are dependent upon the rate of change of current and at saturation the rate of change of current is zero. At saturation then the voltage induced in winding 27 is zero and the base drive to transistor 30 is removed. This is followed by a rapid decrease in current through this transistor and consequent collapse of the magnetic field in the transformer. Upon collapse of the magnetic field, a voltage opposite to that previously induced in winding 27 is developed and similarly applied to the respective bases of the transistors. This reversed potential has the effect of driving transistor 35 into conduction and cutting off transistor 30. Therefore, very fast switching of the transistors is obtained and an alternating current potential is induced in load winding 29. The transistors oscillate at a frequency which is dependent upon the circuit parameters.

The voltages generated in the transformer are a function of the degree to which the transistors are driven conductive.

Resistor 15 is incorporated for starting purposes, since one of the drawbacks of this type of D.C. to D.C. converter is that it may fail to start under load. Resistor 15 provides sufficient drive current for the transistors to insure the converter will always start under load.

The voltage developed across load winding 29 is rectified by diodes 21 and 22, filtered by capacitor 23 and supplied to a load 24, all in a conventional manner.

The circuit just described in conventional albeit slightly simplified since there is no provision for adjusting the output voltage of the D.C. to D.C. converter. This may be remedied by inserting a variable resistance in the center tap lead of feedback winding 27, which resistor may then be used to control the drive to transistors 30 and 35.

The circuit of the invention provides means for not only setting the output level of the D.C. to D.C. converter, but for also maintaining this output potential substantially constant in spite of variations in input voltage, and variations in loading. Considering now the entire circuit as shown in FIG. 1, a control winding 28, feeding a rectifier 40, connected in series with a capacitor 41, is shown. A voltage divider arrangement is connected across capacitor 41 and comprises a fixed resistor 50 and a variable resistor 49. The junction of these two resistors is connected to the base 48 of a transistor 45, which also has an emitter electrode 46 and collector electrode 47. Emitter 46 and the movable arm on the vairable resistor 49 are connected together. The upper terminal of resistor 50 is connected through a resistor 51 to collector 47. A transistor 55 having an emitter 52, a collector 53 and a base 54 is shown with its emitter 52 connected to both point A and emitter 46 of transistor 45. Its base 54 is connected to collector 47 of transistor 45, and its collector 53 is grounded.

Thus, point A has been connected to ground through the emitter-collector circuit of transistor 55. This emitter-collector circuit has an inherent resistance which is dependent upon how heavily the transistor is driven. It can be seen that, if resistor 15 is fairly large, the resistance between emitter 52 and collector 53 of transistor 55 will be determinative of the amount of driving current fed to the respective bases of transistors 30 and 35. Obviously, if these transistors 30 and 35 are driven lightly, their input currents will have a slower rise time and consequently the induced voltages across the portion of winding 26 involved will be smaller. For maximum output voltage, the base-emitter circuits should be driven into saturation quickly.

Control winding 28 has a voltage induced therein which is proportional to the alternating current voltage across winding 26. This induced voltage is rectified and utilized to supply operating potentials for transistor 45. Variable resistor 49 in the input circuit of transistor 45 is used to set the operating level for this transistor, which in turn sets the output voltage level of the D.C. to D.C. converter. During steady state conditions, that is when the voltage input to the converter is substantially constant and the load supplied by the converter is substantially constant, transistor 45 conducts at a steady rate, thus producing a stable bias for transistor 55 which likewise conducts at a steady rate. As mentioned previously, the conduction current in the collector-emitter circuit of transistor 55 determines the effective resistance from point A to ground and consequently the conduction level of transistors 30 and 35. It may also be seen that a change in the setting of variable resistor 49 will produce a change in the output voltage of the converter.

Assuming that there is an increase in input voltage, an increased potential appears across winding 26. Winding 28 senses this change and a correspondingly larger potential is developed across capacitor 41. This potential, it will be observed, is negative at the upper terminal of capacitor 41 and positive at the lower terminal of capacitor 41. The increased potential results in more base-emitter drive to transistor 45 and consequently larger collector-emitter current flow in transistor 45. This causes an increased voltage drop across resistor 51 and a correspondingly smaller voltage drop across collector 47 and emitter 46. These two elements will be seen to be connected across the input circuit of transistor 55. Therefore, the more emitter-collector current flowing in transistor 45, the less drive potential available for transistor 55. Consequently transistor 55 conducts less emitter-collector current, or to say it another way, its emitter-collector resistance increases. This increased resistance is included in the base circuits of transistors 30 and 35 and results in less drive for these transistors, thus driving the base-emitter circuits into saturation less quickly. Consequently, the effect of an increased voltage across winding 26 is to generate a control voltage for decreasing or offsetting the increased voltage.

Similarly it may be shown that for a decrease in input voltage the opposite result occurs, namely transistor 45 is driven less heavily, transistor 55 driven more heavily, and transistors 30 and 35 are correspondingly driven more heavily to increase the overall voltage conversion ratio. With this arrangement a remarkable degree of voltage regulation is obtainable with the addition of a few inexpensive components.

Figure 2:
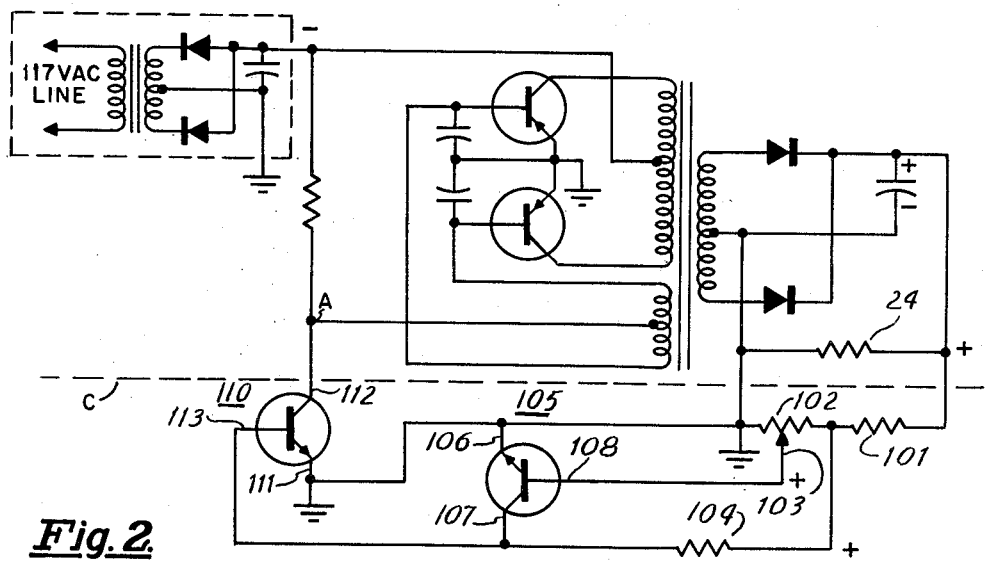
FIG. 2 is a schematic diagram of a modification of the invention.

FIG. 2 is a schematic diagram of an embodiment of the invention which does not require a control winding. When the control winding is eliminated, caution must be exercised in selecting the ground point for the converter. In the embodiment of FIG. 2, the transistors in the feedback control circuits are of the NPN type and the control voltage is selected from across the load circuit. The portion of the circuit above dashed line C operates in the same manner as the corresponding circuit previously described. Load 24 is bridged by resistors 101 and 102. The connection between load 24 and resistor 102 is selected as the ground point and hence, a positive output potential is obtained. Resistor 102 has a movable tap 103 coupled to the base 108 of transistor 105. The junction of resistors 101 and 102 is coupled, through a load resistor 104, to collector 107 of transistor 105. Emitter 106 is connected to ground. The control transistor 110, having an emitter 111, a collector 112 and a base 113, is arranged with its base connected to collector 107, its emitter grounded and its collector connected to point A. This transistor is also of the NPN type.

Assume that the voltage across load resistor 24 increases, corresponding to either a decrease loading or an increased input voltage. The voltage across emitter 106 and base 108 will correspondingly increase and will tend to drive transistor 105 more conductive along its emitter-collector path. This results in a decreased potential across emitter 106 and collector 107, which, it will be noted, are coupled to the base-emitter circuit of transistor 110. This decreased driving potential for transistor 110 results in a corresponding decreased conduction current along its emitter-collector path, or an effective increase in the emitter-collector resistance of transistor 110. This effect is transmitted to the bases of the transistors in the oscillator circuit to lower the output voltage of the converter in the manner aforesaid.

Figure 3:
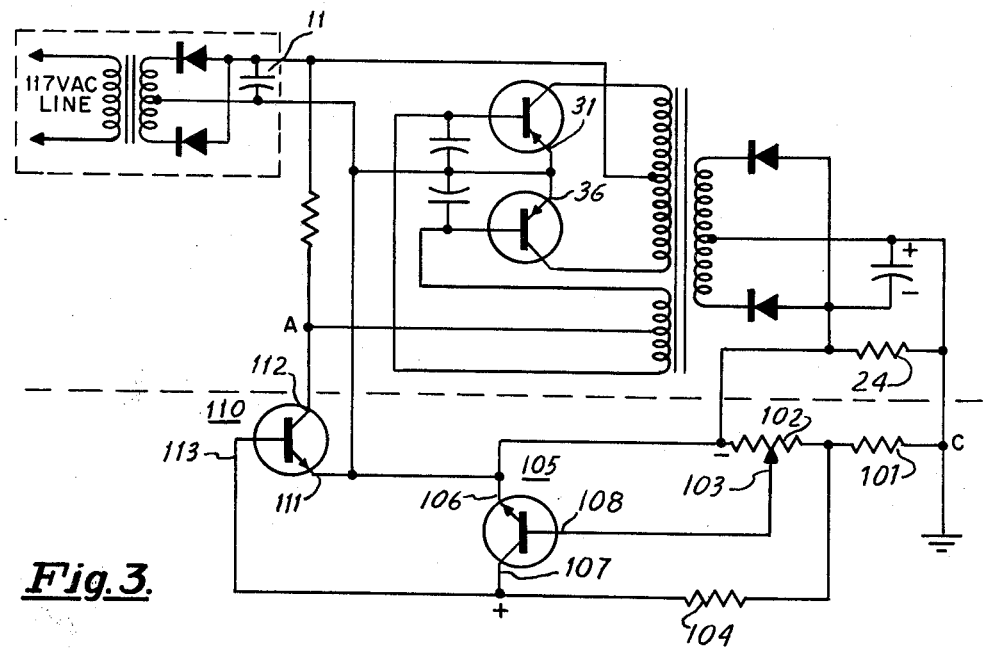
FIG. 3 is a schematic diagram of still another modification of the invention.

In FIG. 3 a further modification of the invention is shown which also obviates the need for a control winding. This circuit is arranged such that the output load voltage is negative, that is, the positive end of load resistor 24 is connected to ground. For proper operation of this circuit, the input power supply ground is removed, which in effect, results in a floating input. To this end, the ground from capacitor 11 is removed, as are the grounds from emitters 31 and 36 of the transistors in the oscillator section. The circuit operates in substantially the same manner as the previously described circuit of FIG. 2 to provide regulation of the output voltage.

Numerous other modifications of the circuits may be readily envisioned, for example substituting transistors of the NPN type for the PNP type and vice versa, which modifications are not deemed to be outside the capabilities of one skilled in the art. Additionally it should also be noted that if the converter is to be used in an environment having substantial temperature change, a thermistor may be added in series with the variable resistors indicated (49 and 102) to compensate for transistor characteristics variation with respect to temperature. The circuit disclosed in FIG. 1 is a preferred embodiment of the invention, since the use of the control winding provides much more flexibility in the utilization of components and the selection of ground points. The circuits of FIG. 2 and FIG. 3 have been included merely to indicate that the scope of the invention is not limited to the actual components or circuits shown in FIG. 1.

What has been described is a novel arrangement for securing excellent voltage regulation characteristics in a transistorized D.C. to D.C. converter, which arrangement does not require the use of expensive reference devices for voltage control. While specific components and circuit arrangements have of necessity been described it will be understood that the invention is to be limited only as defined in the attached claims.

What is claimed is:

1. A voltage regulated transistorized power supply comprising; a self excited transistor oscillator including a pair of transistors and a saturable transformer; a first center tapped winding on said transformer coupled to the output circuits of said transistors; a second center tapped winding on said transformer coupled to the input circuits of said transistors; means for supplying direct current to the center tap on said first winding; a third winding on said transformer for feeding a load circuit; a control transistor having an output circuit coupled to the center tap on said second winding, the conductivity of said output circuit controlling the translation characteristics of said pair of transistors; a control winding on said transformer for developing a control potential indicative of the potential across said first winding; and means for applying said control potential to said control transistor, said control potential providing operating voltages for said control transistor and determining the degree of conductivity in said control transistor; whereby the conductivity of said output circuit of said control transistor is varied as an inverse function of said control potential.

2. In combination with a D.C. to D.C. converter including, a saturable transformer, a pair of transistors having output circuits connected to one winding on said transformer, input circuits connected to another winding on said transformer, and a source of direct current potential for energizing said transistors, said transistors being switched on and off, respectively, responsive to repeated saturation of said transformer thereby developing an alternating current potential in said transformer; a control circuit included in the input circuits of said transistors; said control circuit including a control transistor having its collector-emitter circuit coupled to said input circuits of said transistors, whereby variations in the collector-emitter resistance of said control transistor introduces variations in the translation characteristics of said pair of transistors; a load circuit coupled to said saturable transformer; means for developing a control potential directly related to the potential existing across said load circuit; and means including a single transistor connected between said last mentioned means and said control transistor for amplifying and inverting said control potential; and means for coupling the amplified-inverted control potential to said control transistor whereby the collector-emitter resistance of said control transistor is varied as a direct function of said control potential.

3. Apparatus for converting a direct current voltage of one magnitude into an alternating current votlage of a different magnitude comprising; saturable transformer means including a plurality of separate magnetically linked windings; a pair of transistors having separate output circuits completed through different portions of a first one of said windings and separate input circuits completed through different portions of a second one of said windings; a source of direct current potential of said one magnitude, said source being connected to said first winding at a point which is common to both said transistor output circuits; said source, said transistors and said saturable transformer means cooperating to cause said transistors to be driven conductive and nonconductive respectively, thereby developing said alternating current potential in said transformer means; and means for varying the operating characteristics of said transistors to control the magnitude of said alternating current potential, said means including means for developing a control potential responsive to the magnitude of said alternating current potential, means including an amplifying transistor having operating potentials supplied by said control potential for amplifying and inverting said control potential and a control transistor having an emitter, a collector, and a base, said emitter and said collector being connected to said second winding at a point which is common to both said transistor input circuits, said amplified and inverted control potential being applied to said base of said control transistor whereby the collector-emitter resistance of said control transistor is varied as a direct function of the magnitude of said alternating current potential in said transformer means.

4. A D.C. to D.C. converter of the type having a pair of transistors connected with their output circuits connected across respective halves of a first winding on a saturable transformer, and their input circuits connected across respective halves of a feedback winding on said transformer, means for energizing said output circuits through said first winding from a source of direct current potential, said transistors being selectively driven conductive and nonconductive responsive to saturation of said transformer to produce an alternating current voltage across said first winding, the improvement comprising; a control winding magnetically coupled to said transformer; a rectifier circuit connected across said control winding for developing a direct current control potential related to the said alternating current potential; a first control transistor arranged to amplify and invert said control potential; a second control transistor having an input circuit coupled to said first control transistor and an output circuit connected in common with said respective halves of said feedback winding whereby variations in the impedance of said second control transistor output circuit are effective to vary the translation characteristics of said pair of transistors, said control potential also supplying operating voltage for said first control transistor.

5. A D.C. to D.C. converter comprising; a pair of transistors having respective input and output electrodes and a saturable transformer, said transformer including a main winding connected across said output electrodes of said transistors and a feedback winding connected across said input electrodes of said transistors, a source of direct current potential connected to said main winding for energizing said output electrodes; said source, said transistors and said transformer cooperating to convert the output of said source of direct current potential into an alternating current potential; means for developing a direct current control potential related to the magnitude of said alternating current potential; amplifying means including a transistor operated by said direct current control potential for amplifying and inverting said control potential; and a control transistor having an input circuit coupled to said amplifying means and an output circuit coupled to said feedback winding such that the output circuit impedance of said control transistor is in series with said input electrodes of said pair of transistors and varies as a direct function of said direct current control potential.

6. A D.C. to D.C. converter as set forth in claim 5 wherein said means for developing a direct current control potential includes a control winding magnetically linked with said saturable transformer.

References Cited by the Examiner

UNITED STATES PATENTS

| | | | |
|---|---|---|---|
| 2,950,446 | 8/60 | Humez et al. | 321—2 |
| 2,959,745 | 11/60 | Grieg | 321—2 |
| 2,968,738 | 1/61 | Pintell | 321—2 |
| 3,004,206 | 10/61 | Sheffet | 321—2 |
| 3,012,181 | 12/61 | Schultz | 321—2 |
| 3,067,378 | 12/62 | Paynter | 321—2 |
| 3,075,135 | 1/63 | Ehret | 321—18 |

OTHER REFERENCES

"Transistor Power Convertors," by B. Hamlin, published in C.Q. (May 1958), pages 42 and 43.

LLOYD McCOLLUM, *Primary Examiner.*

SAMUEL BERNSTEIN, *Examiner.*